(12) United States Patent
Shetty et al.

(10) Patent No.: US 11,482,231 B2
(45) Date of Patent: Oct. 25, 2022

(54) SKILL REDIRECTIONS IN A VOICE ASSISTANT

(71) Applicant: VMWARE, INC., Palo Alto, CA (US)

(72) Inventors: Rohit Pradeep Shetty, Bengaluru (IN); Chaoting Xuan, Atlanta, GA (US); Ramani Panchapakesan, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 286 days.

(21) Appl. No.: 16/801,176

(22) Filed: Feb. 26, 2020

(65) Prior Publication Data

US 2021/0210103 A1 Jul. 8, 2021

(30) Foreign Application Priority Data

Jan. 6, 2020 (IN) .............................. 202041000479

(51) Int. Cl.
| | | |
|---|---|---|
| *G10L 15/26* | (2006.01) | |
| *G10L 17/24* | (2013.01) | |
| *G10L 13/027* | (2013.01) | |
| *G06F 21/33* | (2013.01) | |
| *G10L 15/22* | (2006.01) | |

(52) U.S. Cl.
CPC .............. *G10L 17/24* (2013.01); *G06F 21/33* (2013.01); *G10L 13/027* (2013.01); *G10L 15/22* (2013.01); *G10L 15/26* (2013.01); *G10L 2015/223* (2013.01)

(58) Field of Classification Search
CPC .............. G10L 15/22; G10L 2015/223; G10L 2015/225; G10L 25/63; G10L 15/26; G10L 13/00; G10L 13/027; G10L 15/16; G10L 15/1822; G10L 15/187; G10L 15/30; G10L 17/00; G10L 17/22; G06F 3/165; G06F 3/167; G06F 21/21; G06F 21/35; G06F 21/43; H04M 1/72445; H04N 21/42203; H04N 21/4394; H04N 21/47217;

(Continued)

(56) References Cited

U.S. PATENT DOCUMENTS 9,286,899 B1 3/2016 Narayanan
9,928,839 B1 3/2018 Lester et al.
(Continued)

FOREIGN PATENT DOCUMENTS

WO 2016141972 A1 9/2016
WO 2017131267 A1 8/2017

OTHER PUBLICATIONS iMore.com, "What will happen if I delete a device from my iCloud account?" https://forums.imore.com/icloud/345348-what-will-happen-if-i-delete-device-my-icloud-account-html, Oct. 18, 2015 (Year: 2015).

(Continued)

*Primary Examiner* — Vijay B Chawan
(74) *Attorney, Agent, or Firm* — Thomas | Horstemeyer LLP (57) ABSTRACT

Disclosed are various approaches for assisting a user with skill or application discovery in a voice assistant device. By assisting the user in this way, avoiding the launching of malicious skills or applications can also be avoided. Additionally, restricting launching of applications to particular users or particular voice assistant devices can also be accomplished.

20 Claims, 5 Drawing Sheets

(58) Field of Classification Search
CPC .. H04N 21/482; H04N 21/4825; G06N 20/00; G06N 3/006
See application file for complete search history.

(56) References Cited

U.S. PATENT DOCUMENTS

| | | | |
|---|---|---|---|
| 10,063,542 B1 | 8/2018 | Kao | |
| 10,404,678 B2 | 9/2019 | Grajek et al. | |
| 10,524,092 B2* | 12/2019 | Gandhi | H04W 4/06 |
| 10,748,546 B2* | 8/2020 | Kim | G10L 15/16 |
| 10,770,092 B1 | 9/2020 | Adams et al. | |
| 10,832,310 B2* | 11/2020 | Isaacson | G07G 1/14 |
| 10,877,718 B2* | 12/2020 | Gosu | H04N 21/42203 |
| 11,070,949 B2* | 7/2021 | Gross | H04W 4/50 |
| 2002/0076004 A1* | 6/2002 | Brockenbrough | H04L 51/38 379/88.13 |
| 2004/0199538 A1 | 10/2004 | Matsuda et al. | |
| 2008/0021997 A1 | 1/2008 | Hinton | |
| 2009/0034702 A1 | 2/2009 | Cai | |
| 2010/0031329 A1 | 2/2010 | Kim et al. | |
| 2011/0307790 A1 | 12/2011 | Pandya et al. | |
| 2013/0156194 A1 | 6/2013 | Tanioka | |
| 2013/0179692 A1 | 7/2013 | Tolba et al. | |
| 2014/0281547 A1 | 9/2014 | Modzelewski et al. | |
| 2015/0082427 A1 | 3/2015 | Ivanchykhin et al. | |
| 2015/0195406 A1 | 7/2015 | Dwyer et al. | |
| 2015/0244472 A1 | 8/2015 | Poppe et al. | |
| 2016/0119323 A1 | 4/2016 | Krishna | |
| 2016/0224548 A1 | 8/2016 | Massand | |
| 2016/0373490 A1 | 12/2016 | Sedar et al. | |
| 2017/0006044 A1 | 1/2017 | Ezra et al. | |
| 2017/0126640 A1 | 5/2017 | Vincent et al. | |
| 2017/0223613 A1 | 8/2017 | Wang et al. | |
| 2017/0329573 A1 | 11/2017 | Mixter | |
| 2017/0345105 A1* | 11/2017 | Isaacson | G06Q 20/40 |
| 2017/0346949 A1* | 11/2017 | Sanghavi | H04L 51/046 |
| 2018/0007060 A1 | 1/2018 | Leblang et al. | |
| 2018/0199156 A1* | 7/2018 | Gandhi | H04W 4/06 |
| 2018/0204187 A1 | 7/2018 | Stewart et al. | |
| 2019/0007381 A1* | 1/2019 | Isaacson | G06Q 20/401 |
| 2019/0116264 A1* | 4/2019 | Sanghavi | H04M 3/5166 |
| 2019/0132321 A1* | 5/2019 | Pitchaimani | H04W 12/06 |
| 2019/0163896 A1 | 5/2019 | Balaraman et al. | |
| 2019/0306137 A1* | 10/2019 | Isaacson | G06Q 20/12 |
| 2019/0318002 A1* | 10/2019 | Sharma | G06F 3/167 |
| 2019/0339927 A1* | 11/2019 | Gosu | H04N 21/4394 |
| 2019/0361671 A1* | 11/2019 | Maltsev | G10L 15/22 |
| 2019/0377898 A1 | 12/2019 | Dunjic et al. | |
| 2020/0084205 A1 | 3/2020 | Bulpin | |
| 2020/0120088 A1 | 4/2020 | Jain et al. | |
| 2020/0134211 A1 | 4/2020 | Miller et al. | |
| 2020/0228521 A1 | 7/2020 | Edwards et al. | |
| 2020/0349935 A1 | 11/2020 | Smith et al. | |
| 2021/0072951 A1* | 3/2021 | Gosu | H04N 21/47217 |
| 2021/0119794 A1* | 4/2021 | Shpurov | G06F 21/602 |
| 2021/0176229 A1* | 6/2021 | Xuan | H04L 63/0853 |

OTHER PUBLICATIONS

Klein, "How to Remove Devices from Your iCloud Account" https://www.howtogeek.com/240710/how-to-remove-devices-from-your-icloud-account/, Jul. 11, 2017 (Year: 2017).

* cited by examiner

SKILL REDIRECTIONS IN A VOICE ASSISTANT

RELATED APPLICATIONS

Benefit is claimed under 35 U.S.C. 119(a)-(d) to Foreign Application Serial No. 202041000479 filed in India entitled "SKILL REDIRECTIONS IN A VOICE ASSISTANT" on Jan. 6, 2020, by VMWARE, Inc., which is herein incorporated in its entirety by reference for all purposes.

CROSS-REFERENCE TO RELATED APPLICATIONS

This application is related to U.S. patent application Ser. No. 16/453,357, filed Jul. 10, 2019 and entitled PROXIMITY BASED AUTHENTICATION OF A USER THROUGH A VOICE ASSISTANT DEVICE. This application is related to U.S. patent application Ser. No. 16/430,846, filed Jun. 13, 2019 and entitled SERVICE AUTHENTICATION THROUGH A VOICE ASSISTANT. This application is related to U.S. patent application Ser. No. 16/785,682, filed Feb. 10, 2020 and entitled SINGLE SIGN-ON SERVICE AUTHENTICATION THROUGH A VOICE ASSISTANT. This application is related to U.S. patent application Ser. No. 16/799,867, filed Feb. 25, 2020 and entitled SERVICE AUTHENTICATION THROUGH A VOICE ASSISTANT. This application is related to U.S. patent application Ser. No. 16/794,265, filed Feb. 19, 2020 and entitled DATA LEAK PREVENTION USING USER AND DEVICE CONTEXTS. All of the above-referenced applications are incorporated herein by reference in their entireties.

BACKGROUND

In an enterprise setting, individuals can utilize a number of different services and applications that are provided by an enterprise. Some of these services are hosted in a third party environment and some can be hosted on servers operated by the enterprise. These individuals can use authentication credentials to login to these application or services. For example, a user might have an email account or an account with a third party customer relationship management service. Accessing data within these services can be accomplished through a device with which the user is authenticated and which may have an authentication token associated with the user's identity. However, a voice assistant device may not have the capability to easily authenticate the user with his or her service endpoints. In addition, the assistant might be in a shared environment, such as in a hotel room, an office environment, or other environments in which multiple people might have access to the device. Providing access to the user's services to the assistant can create various issues.

First, authentication of the user can be a process can be performed using application programming interfaces (APIs) created by the provider of the assistant ecosystem to link a user's identity with a particular assistant device. Additionally, a risk that malicious skills in the assistant ecosystem might exist with keywords or hotwords that are similar to a legitimate skill associated with a service endpoint can create a risk of sensitive information leaking to the malicious skill. For example, a malicious actor might create a skill with a keyword or hotword that is similar to a customer relationship management (CRM) tool utilized by the enterprise. If a user accidentally invokes the malicious skill, there is a risk of data leakage if the user uses a verbal command that includes sensitive information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples for obtaining data from services on behalf of a user and on behalf of a voice assistant device. A user might have accounts in various services for which access is authenticated using an identity provider service utilized by the user's enterprise. The user can have an account with the enterprise that deploys an identity provider service to enable single sign-on (SSO) capability for users of the enterprise. The identity provider can verify the user's identity within the enterprise and provide an authentication token that can be used to authenticate the user's access to other services, which may or may not be hosted by the enterprise. For example, a third party conferencing service with which the enterprise provides accounts for its users can authenticate users through an identity provider service.

In an environment in which voice assistant devices are becoming more ubiquitous, providing users access to services provided by the enterprise or directly from service endpoints can be beneficial. However, users may not be fully informed or educated with respect to the voice assistant applications or "skills" that are available to them within an enterprise. Because a visual user interface is often unavailable to a user of a voice assistant, discovery of available features or skills of the voice assistant can be difficult. Additionally, an administrator might wish to limit the applications and services that are available using a particular voice assistant or that are available to a particular user.

Additionally, the problem of "skill squatting" can raise security and privacy concerns for an enterprise. Skill squatting involves actions by malicious actors that create skills or applications within a voice assistant ecosystem that are launched with keywords that are similar to existing popular skills to surreptitiously route users to the actors' malicious skills. Given a systematic error from one word to another, a malicious actor can create a malicious skill that has a high likelihood of confusion with a target skill within the voice assistant ecosystem. When a user attempts to access a desired skill using their voice, they are routed instead to the malicious skill due to a systematic error in the interpretation of the input. Such an attack is most similar in style to domain name typo-squatting, where an attacker predicts a common "typo" in domain names and abuses the error to hijack a request and obtain information from a user.

Skill squatting might result in employees accessing malicious skills and sharing confidential login or business information or even getting completely irrelevant information. This is also true in the case of employees being able to access enterprise skills even on their home devices.

Therefore, examples of this disclosure can facilitate skill or application disambiguation for users of a voice assistant. Additionally, redirection to a trusted skill can be provided through a primary skill through which the user can authenticate his or her identity to an identity manager that provides a SSO portal.

Figure 1:
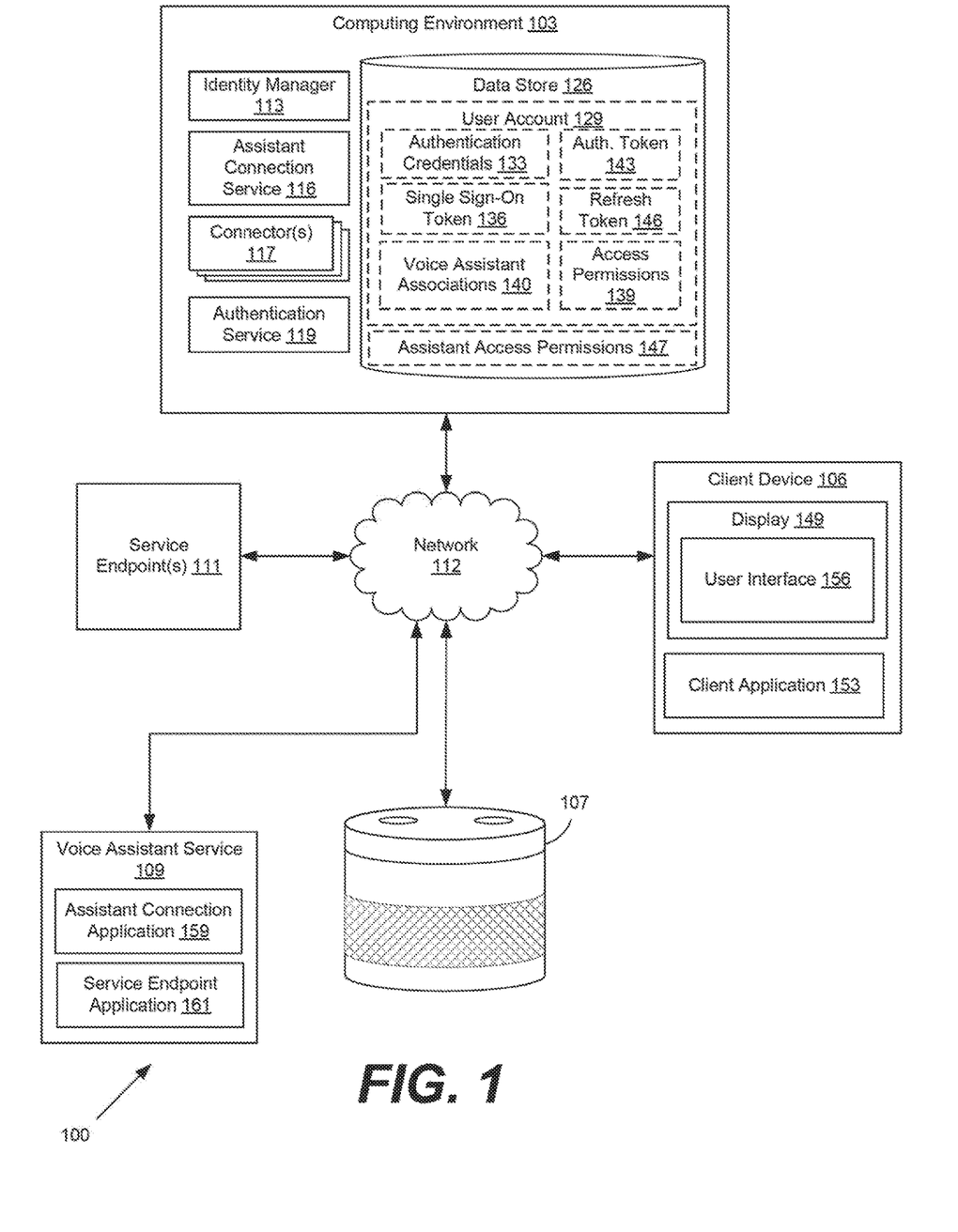
FIG. 1 is a schematic block diagram depicting an example of a network environment according to examples of the disclosure.

Beginning with FIG. 1, shown is an example of a networked environment 100. The networked environment 100 includes a computing environment 103, a client device 106, a voice assistant device 107, a voice assistant service 109, and one or more service endpoints 111, which are in data communication with each other across a network 112. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 113, an assistant connection service 116, one or more connectors 117, and an authentication service 119. In some examples, one or more service endpoints 111 can also be executed in the computing environment 103 in the case of service endpoints that are provided by the enterprise on the same computing resources of the enterprise. In some embodiments, however, one or more of the service endpoints 111 can be executed in a separate computing environment that is in communication with the computing environment 103 across the network 112.

Also, various data is stored in a data store 126 that is accessible to the computing environment 103. The data store 126 can be representative of a plurality of data stores, which can include relational databases, object-oriented databases, hierarchical databases, hash tables or similar key-value data stores, as well as other data storage applications or data structures. The data stored in the data store 126 is associated with the operation of the identity manager 113, the assistant connection service 116, the connector(s) 117, the authentication service 119, and one or more of the service endpoints 111, as well as potentially other applications or functional entities described later. This data can include one or more user accounts 129 and potentially other data.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions 139 to access one or more service endpoints 111. Examples of identity managers 113 include VMWARE's Identity Manager, Workspace ONE, or MICROSOFT's Active Directory Federation Services.

The authentication service 119 can retrieve and cache authentication data, such as authentication tokens 143 and refresh tokens 146, provided by various service endpoints 111. The cached authentication data can be used by the assistant connection service 116 to query the service endpoints 111 for information.

The assistant connection service 116 can facilitate authentication of users who are using an assistant device 107 with the identity manager 113. Additionally, the assistant connection service 116 can enable users to retrieve information from one or more service endpoints 111 for playback by a voice assistant device 107 that the user can associate with their user account 129 through the assistant connection service 116. The functionality of the assistant connection service 116 can also be implemented within a service endpoint 111. The assistant connection service 116 can act as a server or backend service for an assistant connection application 159 that is implemented as a skill or application within a voice assistant ecosystem. For example, as a user makes a query with a hotword associated with the assistant connection application 159 to a voice assistant device 107, the assistant connection application 159 can obtain a speech-to-text representation of the query and provided the representation to the assistant connection service 116. The assistant connection service 116 can respond to the assistant connection application 159 as it is instrumented or configured to do so.

A connector 117 can provide a standardized mechanism for the assistant connection service 116 to communicate with a service endpoint 111. Each service endpoint 111 may provide an application programming interface (API) for communicating, querying, or otherwise interacting with the service endpoint 111, which can include different methods or functions with different parameters compared to other service endpoints 111. This can allow for the assistant connection service 116 to send a single, uniformly formatted query to one or more connectors 117. Each connector 117 is then responsible for using the information provided in the query from the assistant connection service 116 to invoke the appropriate functions provided by the API of the service endpoint 111. To add support for a new service endpoint 111, a new connector 117 can be created without needing to modify the assistant connection service 116 itself. Likewise, if a change is made to the API of the service endpoint 111, the connector 117 between the assistant connection service 116 and the federated service can be updated without having to modify the assistant connection service 116 itself.

A service endpoint 111 can be web application, web service, or other network facing application that can be accessed using a shared identity manager 113. A service endpoint 111 can also provide its own authentication flow or mechanism rather than rely upon a shared identity manager 113. One or more service endpoints 111 can be provided by the same provider or by different providers.

The user account 129 represents information associated with a user. The information can include one or more authentication credentials 133, one or more single sign-on tokens 136, and/or one or more access permissions 139 applied to the user account, as well as cached authentication tokens 143 and refresh tokens 146. Voice assistant associations 140 can specify one or more voice assistant devices 107 that are associated with a user account 129 and with which a user has authenticated. Once a voice assistant association 140 is established by a user, the assistant connection service 116 can provide data from a service endpoint 111 for playback by the voice assistant device 107. Other information about the user can also be stored as part of the user account 129, such as the user's name or contact information.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 136 is a software token generated by the identity manager 113 in response to a successful authentication of the user with the identity manager 113 using the authentication credentials 133. The SSO token 136 can be used to provide a client device 106 access to various service endpoints 111 on behalf of the authenticated user. Additionally, the SSO token 136 can be used by the assistant connection service 116 to access various service endpoints 111 on behalf of the authenticated user and a voice assistant device 107 associated with the user. In some instances, such as those implementing a version of the KERBEROS protocol, a separate SSO token 136 can be generated for each service endpoint 111 that the client device 106 attempts to access on behalf of the user. In other instances, the single SSO token 136 can be generated and used to provide the client device 106 with access to several of the service endpoints 111. Although each of the service endpoints 111 can have a different set of authentication credentials 133 linked to the user account 129, such as a different user name and password combination, the SSO token 136 allows the user to authenticate once with the identity manager 113 in order to use each of the service endpoints 111 instead of having to authenticate with each of the service endpoints 111 separately.

The access permissions 139 represent computing resources that the user account is authorized to access. For example, the access permissions 139 can indicate that a user account is permitted to access some service endpoints 111 but is prohibited from accessing other service endpoints 111. As another example, the access permissions 139 can indicate that the user account 129 is allowed to access certain features of a service endpoint 111 but prohibited from accessing other features. For example, if one of the service endpoints 111 that a user was permitted to access was a customer relationship management (CRM) service, the user might have permission to access his or her own contacts but be prohibited from accessing the sales contacts of other users. The access permissions 139 can also specify whether a user account 129 is entitled to access a particular service endpoint 111 through a voice assistant device 107. Some users may be entitled to access the data from a service endpoint 111 through a voice assistant device 107 whereas other users in an enterprise may not.

An authentication token 143 is a token provided by one of the service endpoints 111 in response to a successful authentication with the service endpoint 111. The authentication token 143 represents that a user account 129 is currently authenticated by the service endpoint 111 and authorized to access or otherwise interact with the service endpoint 111 in some capacity. For security purposes, the authentication token 143 often has a time-limit associated with it, such as 1 hour, 3 hours, 6 hours, 8 hours, or some other period of time). Once the time-limit has expired, the authentication token 143 can no longer be used to prove current authentication status of the user account 129 with the service endpoint 111. The authentication token 143 can be provided, for example, as part of an authentication exchange using a version of the OAUTH protocol.

A refresh token 146 is a token provided by one of the service endpoints 111 in response to a successful authentication with the service endpoint 111. The refresh token 146 can be used to acquire a new authentication token 143 once a current or previous authentication token 143 expires. The refresh token 146 often has a much longer time-limit associated with it, such as 1 day, 1 week, 30 days, 3 months, or 1 year, which allows for the refresh token 146 to be used to acquire a series of authentication tokens 143 after an initial successful authentication. In the event that a user's access is revoked, the refresh token 146 can be marked invalid, preventing the refresh token 146 from being used to acquire new authentication tokens 143. The refresh token 146 can be provided, for example, as part of an authentication exchange using a version of the OAUTH protocol.

Assistant access permissions 147 can specify whether a particular voice assistant device 107 is entitled to access. An administrator can determine that a particular voice assistant device 107 in one conference room is entitled to access a particular subset of service endpoints 111 while a different voice assistant device 107 in a different conference room is entitled to access a different subset of service endpoints 111. Additionally, an administrator might also determine that voice assistant devices 107 that are not located within or managed by the enterprise are entitled to access a different set of service endpoints 111 than one that is managed by the enterprise. Therefore, the assistant access permissions 147 can identify a voice assistant device 107 by a device identifier as well as particular applications or service endpoints 111 that are enabled on the voice assistant device 107.

Each service endpoint 111 can be associated with a federated user account 131. A user with a user account 129 may also have multiple federated user accounts. For example, a user may have one federated user account for each service endpoint 111 that the user is registered or enrolled with. As another example, the user may have multiple federated user accounts for a service endpoint 111 (e.g., a personal federated user account and a separate federated user account for business or professional purposes). The federated user account can be associated with an SSO token 136 and an authentication token 143.

The client device 106 is representative of a plurality of client devices 106 that can be coupled to the network 112. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 153. The client application 153 can cause a user interface 156 to be rendered on the display 149. The client application 153 can represent various types of applications executable by the client device 106. For example, the client application 153 could be a web browser and the user interface 156 could include a web page rendered within a browser window. As another example, the client application 153 could be an email application and the user interface 156 could represent a graphical user interface for viewing, editing, and composing emails.

Additionally, the client application 153 can represent an application that facilitates user authentication with the authentication service 119 and the assistant connection service 116 so that a user can create an association between a voice assistant device 107 and her user account 129. The client device 106 can include one or more local area network interfaces, microphones, speakers, or cameras that facilitate communication with a voice assistant device 107.

The voice assistant device 107 represents a smart speaker or any device that has a microphone and audio playback capability to provide a voice assistant experience. A voice assistant experience means an experience in which a user can provide spoken commands or requests that are captured by one or more microphones integrated with or in communication with the voice assistant device 107, and the voice assistant device 107 play back audio using a speaker in response to the spoken commands or requests. For example, a user can ask the voice assistant device 107 to play music or retrieve information from the Internet, and the voice assistant device 107 can cause playback of the requested music or information through an integrated speaker or an audio playback device in communication with the voice assistant device 107.

The voice assistant service 109 can communicate with the voice assistant device 107 to process voice commands and facilitate retrieval of information for playback through the voice assistant device 107. The voice assistant service 109 can perform voice recognition or speech-to-text conversion on audio captured by the voice assistant device 107, identify a command or action to perform in response to the captured audio, and response to the voice assistant device 107 audio that should be played back through the voice assistant device 107. The voice assistant service 109 can also provide an API so that third parties can create applications or extend the capabilities of the voice assistant device 107. These applications or capabilities can be implemented within a cloud-based voice assistant service 109 so that the functionality does not need to be implemented within every voice assistant device 107 that is deployed in order for extended capabilities to be available to every user.

In the context of this disclosure, the assistant connection application 159 can facilitate authentication of a user with the assistant connection service 116 using the voice assistant device 107. Upon authentication, the assistant connection application 159 can retrieve data from the assistant connection service 116 or service endpoints 111 and cause at least a portion of the data to be played back through the voice assistant device 107. Accordingly, various commands can be implemented in the assistant connection application 159, such as commands to retrieve or make changes to data in a user's calendar, email, or other federated services.

Also in the context of this disclosure, any functionality discussed as being performed by the assistant connection application 159 or assistant connection service 116 can be performed in a single application or service. Additionally, any functionality discussed as being performed by the assistant connection application 159 can be performed instead by the assistant connection service 116 or vice-versa.

A service endpoint application 161 represents an application implemented within the voice assistant service 109 that can be used to access data from a corresponding service endpoint 111. The service endpoint application 161 can obtain data from a third party service 111 and permit playback of the data through a voice assistant device 107. The service endpoint application 161 can be instrumented to receive voice or text queries from the voice assistant device 107 and perform operations within the service endpoint 111 on behalf of a user. The voice assistant service 109 can invoke or execute the service endpoint application 161 in response to a keyword or hotword that is detected by the or on behalf of the voice assistant device 107.

The service endpoint 111 to which a service endpoint application 161 corresponds will typically require some form of user authentication before providing the service endpoint application 161 with user-specific data or information. For example, the service endpoint 111 might be a salesforce tool that contains highly sensitive sales lead data. Accordingly, the service endpoint application 161 or the assistant connection application 159 can authenticate a user's access to the service endpoint 111. Additionally, the service endpoint application 161 or the assistant connection application 159 can permit SSO. In this way, once a user has associated the voice assistant device 107 with his or her user account 129 by authenticating with the identity manager 113, the identity manager 113 can also allow the user to access service endpoints 111 that have federated their authentication to the identity manager 113.

Next, a general description of the operation of the various components of the networked environment 100 is provided. To begin, a user of the client device 106 authenticates with the identity manager 113. For example, the identity manager 113 can generate and send a web page to a browser executing on the client device 106. The user can use the web page to submit his or her authentication credentials 133 to the identity manager 113. The identity manager 113 can then determine whether the submitted authentication credentials 133 match the authentication credentials 133 stored for the user account 129. If the authentication credentials 133 match, the identity manager 113 determines that the user is authenticated. In response, the identity manager 113 can generate an SSO token 136 to represent the authenticated user. In some embodiments, the identity manager 113 can also notify the authentication service 119 of the authentication event. In these embodiments, the notification can include a user identifier and the SSO token 136. In other embodiments, the identity manager 113 can instead provide the SSO token 136 to the client application 153 executing on the client device 106. In these embodiments, the client application then provides the SSO token 136 to the authentication service 119. In some examples, the user can authenticate his or her identity with the identity manager 113 through the assistant connection application 159, which can facilitate a voice match process to authenticate the user account 129.

In some embodiments, the authentication service 119 can then authenticate the user with one or more of the service endpoints 111 in the background or upon the first request for data from a particular service endpoint 111. For example, the authentication service 119 can send the user's SSO token 136 to each service endpoint 111 that an access permission 139 indicates a user is authorized to access. In other instances, the authentication service 119 can send the user's SSO token 136 to every service endpoint 111 that is registered with the identity manager 113. In some embodiments, the SSO token 136 can be included in an authentication request that complies with a version of the OAUTH protocol.

The computing environment 103 can also verify that the user account 129 associated with the SSO token 136 is allowed to access the service endpoint 111. For example, the authentication service 119 or assistant connection service 116 can query the data store 126 to retrieve a username or other user identifier for the user account 129 associated with the single sign-on token 136. The computing environment 103 can then compare the retrieved username or other user identifier with its own list of registered or authorized users. If the retrieved username or other user identifier matches a username or user identifier stored in the list of registered or authorized users maintained by the service endpoint 111, then the computing environment 103 can determine that the user account 129 linked to the SSO token 136 is authorized to access the service endpoint 111. Upon successful authorization, the computing environment 103 can generate an authentication token 143 and a refresh token 146 and provide them to the authentication service 119. In some instances, the authentication token 143 and the refresh token 146 can be included in a response that complies with a version of the OAUTH protocol.

The authentication service 119 can then cache or otherwise store the authentication token 143 and the refresh token 146 for future use. The authentication service 119 can, for example, provide the authentication token 143 in response to requests from authorized applications. For example, the authentication service 119 can provide the authentication token 143 for the user in response to a request from the assistant connection service 116.

In addition, the authentication service 119 can automatically obtain a new authentication token 143 for the user when the current authentication token 143 expires or is about to expire. For example, the authentication service 119 can determine that the authentication token 143 was obtained 59 minutes ago, but is only valid for one hour. As another example, the authentication service 119 can determine that the authentication token 143 was obtained 61 minutes ago, but the authentication token 143 was only valid for one hour. In response to either example, the authentication service 119 can submit a second authentication request to the service endpoint 111. The second authentication request can include the refresh token 146.

In response, the service endpoint 111 can evaluate the refresh token 146 to determine whether the refresh token 146 is still valid. For example, the service endpoint 111 could evaluate the refresh token 146 to determine whether it has expired. As another example, the service endpoint 111 could evaluate the refresh token 146 to determine whether it has been revoked. If the refresh token 146 remains valid, the service endpoint 111 can then provide the authentication service 119 with a new authentication token 143. By storing authentication tokens 143 in the data store 126, the assistant connection service 116 can utilize the tokens to access data from one or more service endpoint 111 on behalf of the user.

Accordingly, a user might desire to use a voice assistant device 107 to access data from service endpoints 111. The voice assistant device 107 might be in a shared environment, such as a hotel, office, or other shared setting. Accordingly, the functionality associated with the assistant connection application 159 can provide a skill or capability that the user can invoke on the voice assistant device 107. The assistant connection application 159 can communicate with the assistant connection service 116 to make a determination as to whether a user account 129 is associated with a particular voice assistant device 107. Additionally, the assistant connection application 159 and assistant connection service 116 can exchange communications that enable the voice assistant device 107 to play back data requested by the user.

The assistant connection application 159 can be invoked by the user through a keyword spoken by the user. For example, the user can speak "Assistant, please open enterprise workspace." The keyword "enterprise workspace," or any other keyword, can be associated with the assistant connection application 159 within the assistant ecosystem. When the user invokes the assistant functionality on the voice assistant device 107 and speaks a particular keyword, the assistant connection application 159 can be launched by voice assistant service 109.

The assistant connection application 159 can facilitate skill or application discovery of trusted service endpoint application 161 rather than potentially malicious applications. The assistant connection application 159 can be utilized as a primary skill with which users in the enterprise are familiar because it is the application through which the user's identity is authenticated. Therefore, after invoking the assistant connection application 159 with the keyword with which the user is familiar, the user can ask the assistant connection application 159, or submit a voice query to the assistant connection application 159. The voice query can include a question or request that can be more appropriately handled or serviced by another application, such as a service endpoint application 161 on behalf of a service endpoint 111.

For example, the user might ask the assistant connection application 159, "please tell me about my next sales lead," which is a voice query that might be more appropriately handled by a service endpoint application 161 corresponding to a third party customer relationship management (CRM) service. In this scenario, the assistant connection application 159 can redirect the user to the service endpoint application 161. As another example, the user might ask, "please tell me about my next appointment," which is a voice query that might be more appropriately handled by a different service endpoint application 161 corresponding to a third party calendar service. In this scenario, the assistant connection application 159 can redirect the user to the service endpoint application 161.

The assistant connection application 159 can obtain a speech-to-text representation of the voice query and transmit the representation to the assistant connection service 116. The assistant connection service 116 can determine whether any words or phrases in the representation are mapped to a service endpoint application 161 that is also accessible to the voice assistant device 107 from which the representation was received. Accordingly, the representation can be accompanied by a device identifier. If words or phrases in the voice query are associated with a service endpoint application 161, the assistant connection service can generate a redirection to the service endpoint application 161.

A redirection can take various forms. In one example, the redirection can be an instructive reply that informs the user of the keyword or hotword associated with the service endpoint application 161. The instructive reply can be a voice response that is played back by the voice assistant device 107 and includes a suggestion that tells the user that their voice query might be better handled by another application rather than the assistant connection application 159.

In some examples, the redirection can be the launching of the appropriate service endpoint application 161 within or on behalf of the voice assistant device 107. Some voice assistant ecosystems may allow a third party application such as the assistant connection application 159 to launch other applications. Accordingly, in response to the voice query from the user, the assistant connection application 159 can launch a particular service endpoint application 161 as the redirection. Additionally, if the assistant connection service 116 has facilitated SSO through the assistant connection application 159 on behalf of the user account 129, the assistant connection application 159 can also provide the service endpoint application 161 with an authentication token corresponding to the service endpoint 111 on behalf of the user account 129 of the currently logged in user. In this way, the user does not have to reauthenticate her identity to the service endpoint 111.

Figure 2:
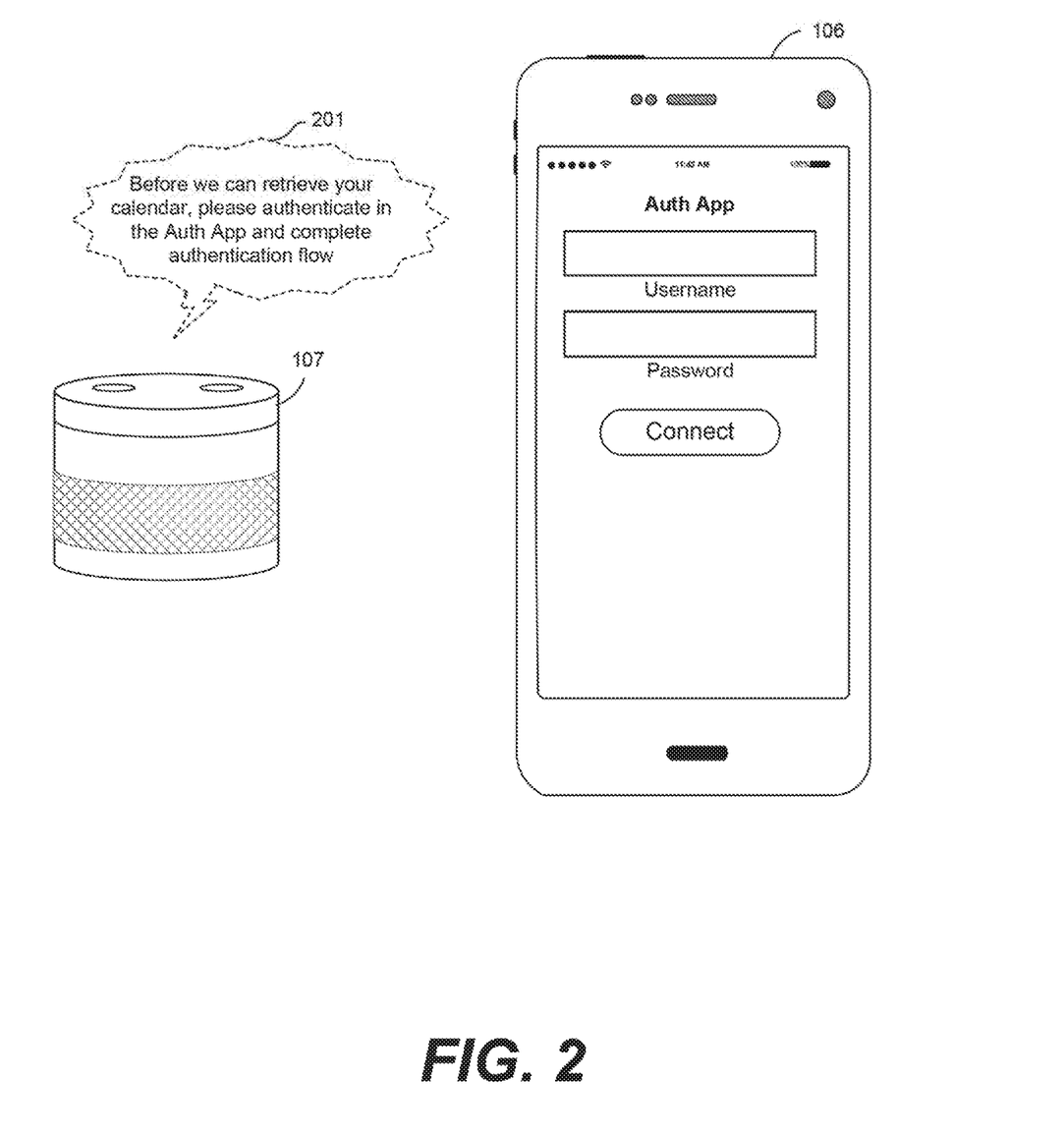
FIG. 2 depicts a scenario according to examples of the disclosure.

Referring next to FIG. 2, shown is a scenario that illustrates how interactions between a user, the voice assistant device 107, and the user's client device 106 can operate. In the scenario shown, the user has invoked the functionality in the voice assistant device 107 that is provided by the assistant connection application 159. Again, the assistant connection application 159 can be implemented using APIs provided by an assistant platform on which the voice assistant device 107 runs. The assistant connection application 159 can be implemented as a third party application, skill, or capability of the voice assistant device 107 that extends the capability of the voice assistant device 107 to enable users to obtain data from service endpoints 111 associated with the user account 129.

In FIG. 2, the user can ask the voice assistant device 107 to launch or invoke the assistant connection application 159 by using a keyword linked to the assistant connection application 159 within an assistant ecosystem in which the voice assistant device 107 operates. For example, the user can request the voice assistant device 107 to launch their "enterprise workspace" or another keyword that is associated with the assistant connection application 159. The user can request that the voice assistant device 107 retrieve data from the user's calendar, email, task list, or another service endpoint 111 for which access can be authenticated by the identity manager 113. Upon launching the assistant connection application 159, the user can either request that the assistant connection application 159 authenticate her user account 129 or access data from a service endpoint 111 linked to her enterprise account. The assistant connection application 159 can identify the voice assistant device 107 from which the request is originating and determine whether the voice assistant device 107 is linked to a user account 129 in the data store 126. If the voice assistant device 107 is not linked with a voice assistant association 140 of a user account 129, the assistant connection application 159 can cause the voice assistant device 107 to play back a message 201 that tells the user that authentication is required before data can be retrieved from a service endpoint 111.

The message 201 can instruct the user to launch a particular application on a client device 106. The application can be a single sign-on application that is used by the enterprise to facilitate single sign-on functionality for other apps and service endpoints 111 that the user might access through a smartphone, personal computer, or other device. The application on the client device 106 can allow the user to authenticate with the identity manager 113 and obtain SSO tokens that other apps on the client device 106 can utilize to authenticate the user's identity to service endpoints 111.

Accordingly, a client application 153 on the client device can facilitate authentication of the user through the voice assistant device 107 so that the voice assistant device 107 is linked with the user account 129 of the user. Once authentication has been established through the client application 153, the user can then request the voice assistant device 107 to obtain data from service endpoints 111 of the user. As shown in FIG. 2, the user can provide his or her credentials to a client application 153, which authenticates her identity with the identity manager 113. The credentials can take the form of a username and password, biometric credentials, a one-time password, or other credentials. In some cases, the user may have previously authenticated her identity with the identity manager 113 using the client application 153 to access applications or service endpoints 111 on the client device.

In some scenarios, the user may have already provided her authentication credentials to the client application 153 and authenticated herself to the identity manger 113, assistant connection service 116, or a management service. In this scenario, the user can simply launch the client application 153 and initiate a flow that associates the voice assistant device 107 with the user account 129 of the user using a passphrase. The authentication flow can involve using a passphrase, an audio fingerprint, voice fingerprinting, or another authentication mechanism to associate the voice assistant device 107 with a user account 129 of a user.

Figure 3:
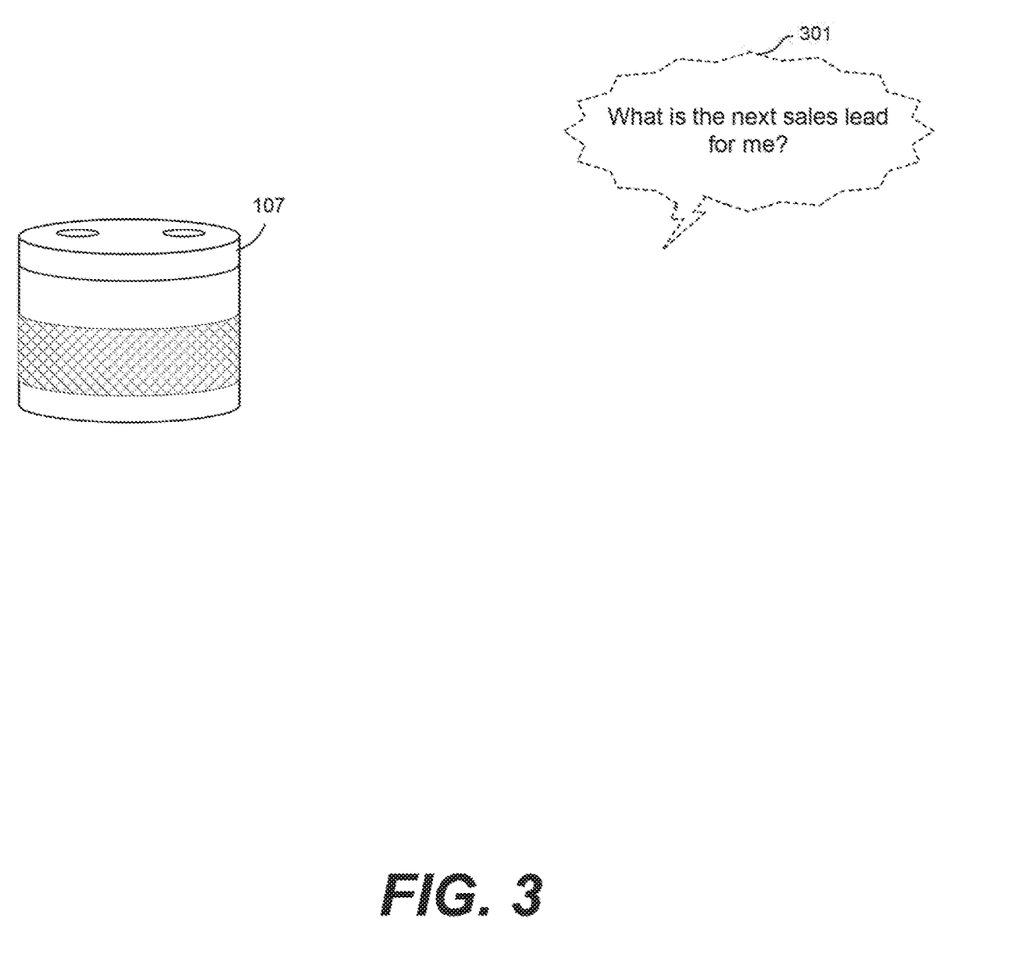
FIG. 3 depicts a scenario according to examples of the disclosure.

Referring next to FIG. 3, the user has authenticated their identity and associated the voice assistant device 107 with a user account 129. The user has also invoked the assistant connection application 159 through a keyword or hotword associated with the assistant connection application 159 in the voice assistant ecosystem. Next, the user has asked the assistant connection application 159 through a voice query captured by the voice assistant device 107 about information that the user would like to retrieve.

The assistant connection application 159 can consult a lookup table or other data structure that maps words and/or phrases to one or more service endpoint applications 161 that are available on the voice assistant device 107 or within a voice assistant ecosystem. The mapping can relate words or phrases to an application identifier and/or an application keyword or hotword that is used to launch the service endpoint application 161. Accordingly, if a user speaks or submits a query that includes a word or phrase that is mapped to a particular service endpoint application 161, the assistant connection application 159 can generate a redirection to the mapped service endpoint application 161.

As shown in the scenario of FIG. 3, the user has submitted a voice query to the voice assistant device 107. The scenario assumes that the user has invoked or launched the assistant connection application 159 and submitted the query to the assistant connection application 159. In the scenario of FIG. 3, the phrase "sales lead" can be mapped to a particular service endpoint application 161. The data structure containing the mappings of words and phrases to service endpoint applications 161 can be stored in the assistant connection application 159 or in a lookup table in the data store 126. The assistant connection application 159 can access a remotely stored mapping table through the assistant connection service 116 or another service.

In some examples, the mapping table can be updated overtime based upon new words or phrases and new service endpoint applications 161 that can later arise. Additionally, the assistant connection service 116 can employ a machine learning or artificial intelligence process to update the mapping table as voice queries are submitted to the assistant connection application 159 and users take subsequent actions within the assistant connection application 159. For example, suppose that a user submits the query depicted in FIG. 3 and there exists no mapping to a service endpoint application 161. Further, suppose that the user next launches a particular service endpoint application 161. The assistant connection application 159 can report this activity to the assistant connection service 116, which can update the mapping table.

Figure 4:
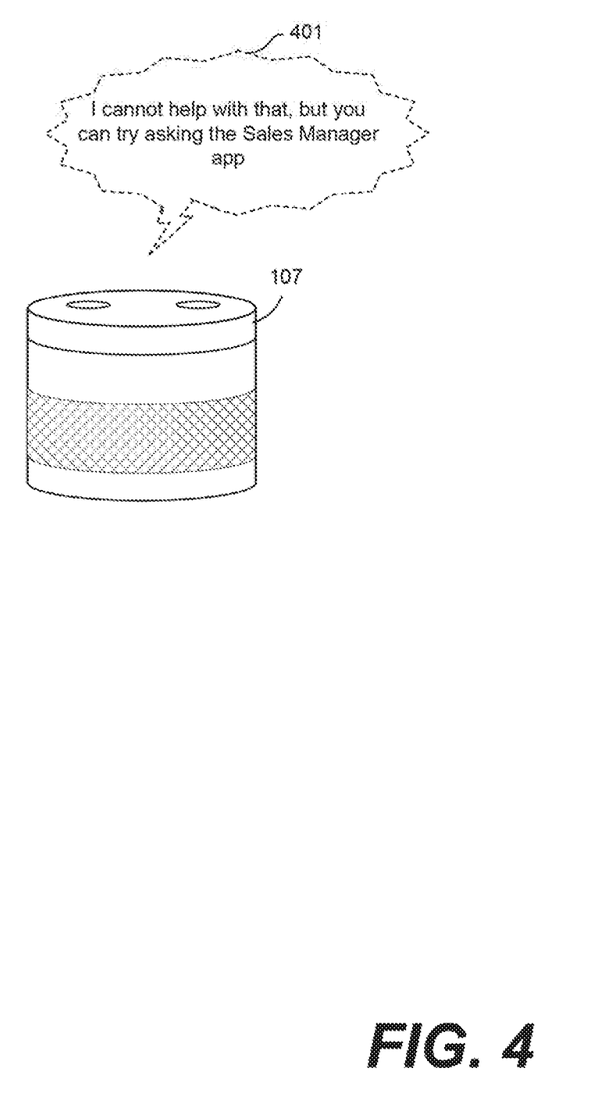
FIG. 4 depicts a scenario according to examples of the disclosure.

Continuing the scenario of FIG. 3, reference is made to FIG. 4. As shown in FIG. 4, the assistant connection application 159 can respond to the user's voice query through the voice assistant device 107. The assistant connection application 159 has played back a redirection generated by the assistant connection application 159 on its own or with the assistance of the assistant connection service 116. As noted above, the redirection can also take the form of launching the service endpoint application 161 on behalf of the user and providing the service endpoint application 161 with an authentication token corresponding to the user account 129 for the service endpoint 111 so that the user does not have to authenticate his identity to the service endpoint 111. In some examples, the assistant connection service 116 can cause the assistant connection application 159 to play the message 401 as well as launch the identified service endpoint application 161.

Figure 5:
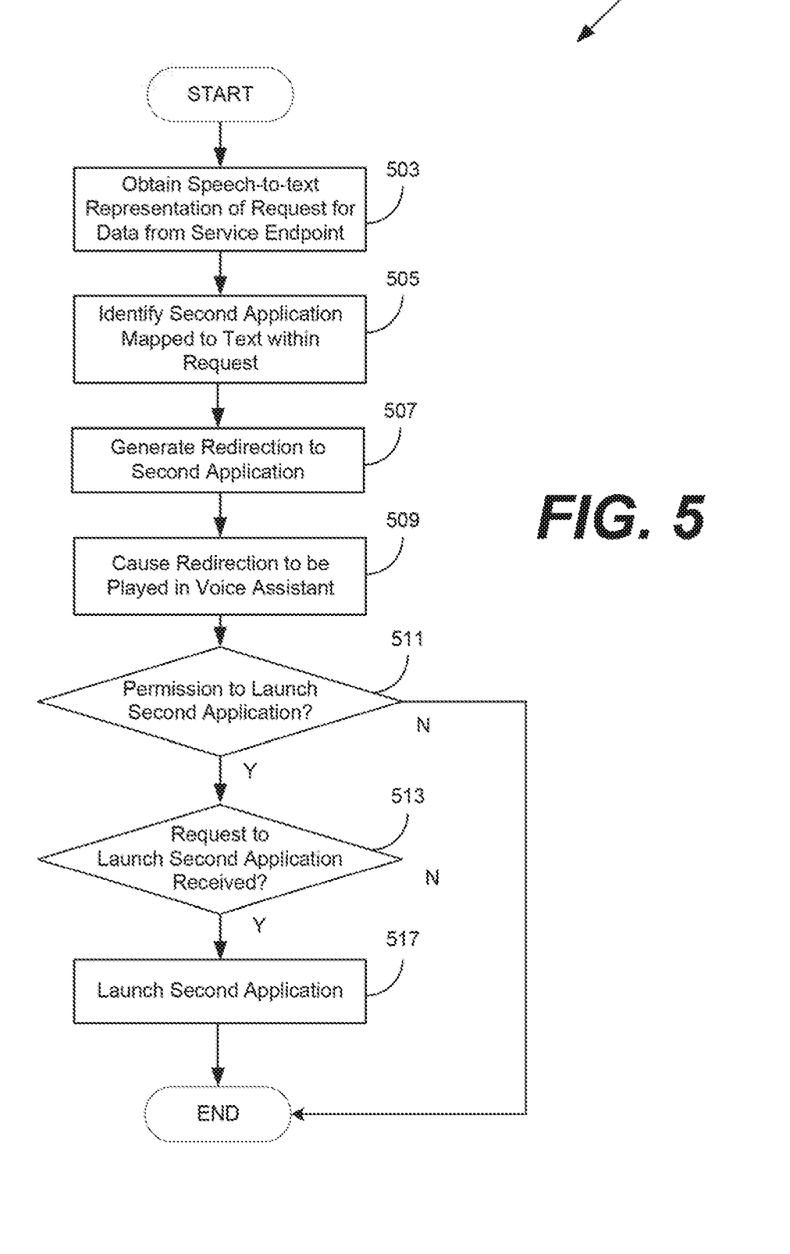
FIG. 5 is a flow chart depicting the operation of an example of a component of the client device of the network environment of FIG. 1.

FIG. 5 is a flowchart depicting an example of the operation of a portion of the assistant connection service 116. It is understood that the flowchart of FIG. 5 provides merely an example of the many different types of functional arrangements that can be employed to implement the portion of the assistant connection service 116 as described herein. As an alternative, the flowchart of FIG. 5 can be viewed as depicting an example of elements of a method implemented by the assistant connection service 116 in some implementations. The flowchart shown in FIG. 5 assumes that the user has previously authenticated with the assistant connection application 159 and launched the assistant connection application 159 within the voice assistant device 107.

Beginning at step 503, the assistant connection service 116 can receive a request for data from the assistant connection application 159. The request can be a voice query that is captured by an audio capture system of the voice assistant device 107. In some cases, the request can be text that is transcribed from audio captured by the voice assistant device 107. The assistant connection service 116 can obtain a speech-to-text representation of the voice query obtained by the voice assistant device 107. The representation can be transcribed by a speech-to-text engine provided by the voice assistant ecosystem. In the context of this discussion, the assistant connection application 159 can also be referred to as a first application.

Next, at step 505, the assistant connection service 116 can identify a second application, or service endpoint application 161, separate from the assistant connection application 159 that is mapped to one or more words or phrases within the representation obtained in step 503. The mapping can be stored in the data store 126 as a JavaScript Object Notation (JSON) data structure or any data structure that permits the mapping of words or phrases to one or more other values, such as a keyword and an application identifier associated with a service endpoint application 161. In some cases, two different applications or skills available to the voice assistant device 107 can have the same keyword or hotword. In this scenario, the if the same utterance or keyword corresponds to two different skills or applications, the assistant connection service 116 can identify the second application based on the user account 129 and to which application the user is more likely to use based on factors such as a user group of the user, a history or queries to the assistant connection service 116 or other sources, and applications to which the user is entitled to access or not entitled to access. The assistant connection service 116 can then rank the applications matching the provided words or phrases based upon this analysis before selecting a highest ranked application from the mapping.

At step 507, the assistant connection service 116 can generate a redirection to the identified service endpoint application 161. The redirection can be a message that can be played back to the user using a text-to-speech engine of the voice assistant device 107. The redirection can also include launching the service endpoint application 161 if permitted by the voice assistant device 107. The redirection can also include providing an authentication token corresponding to the service endpoint 111 that was obtained on behalf of the user account 129 by the identity manager 113 in response to a previous authentication of the user through the voice assistant device 107 or using the assistant connection application 159.

In some examples, the assistant connection service 116 can determine whether a user account 129 that is currently associated with the voice assistant device 107 has permission to launch the identified service endpoint application 161 and/or whether the particular voice assistant device 107 has permission launch the service endpoint application 161. If the user account 129 or the voice assistant device 107 is not authorized to launch the service endpoint application 161, the redirection can inform them of this.

At step 509, the assistant connection service 116 can cause the assistant connection application 159 to play the redirection in the voice assistant device 107. The redirection can instruct the user that their voice query could be more appropriately handled by a different application on the voice assistant device 107, such as the service endpoint application 161.

At step 511, the assistant connection service 116 can determine whether the assistant connection application 159 on the voice assistant device 107 has permission launch the identified service endpoint application 161. If no permission exists depending upon the settings of the voice assistant device 107 or policies within the voice assistant ecosystem, the process can proceed to completion. Otherwise, the process can proceed to step 513.

At step 513, the assistant connection service 116 can determine whether a request to launch the service endpoint application 161 was received from user. In some examples, upon playing the redirection at step at step 509, the assistant connection application 159 can wait for the user to request to launch the service endpoint application 161. For example, the redirection can end with a question posed to the user about whether the user would like to launch the identified service endpoint application 161. If the user confirms that he or she would like to launch the identified service endpoint application 161, the assistant connection service 116 or assistant connection application 159 can cause the service endpoint application 161 to be launched on the voice assistant device 107. Thereafter, the process proceeds to step 517. If no request to launch the service endpoint application 161 was received, the process can proceed to completion.

At step 517, the assistant connection service 116 can cause the service endpoint application 161 identified from the mapping of word or phrases to service endpoint applications 161. Thereafter, the process proceeds to completion.

The flowchart of FIG. 5 shows examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 5 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

What is claimed is:

1. A system for authenticating a user with a service account through a voice assistant, comprising:
    at least one computing device;
    at least one application that, when executed by the at least one computing device, causes the at least one computing device to at least:
        obtain a request for data associated with a user account on behalf of a voice assistant, the request received on behalf of a first application implemented in the voice assistant, wherein the request for data comprises a voice request obtained by a microphone associated with a voice assistant device;
        obtain a speech to text representation of the representation of the request for data;
        identify a second application implemented in the voice assistant from which the data can be obtained based upon a mapping of words and phrases to other keywords;
        generate a redirection to the second application, wherein the redirection comprises a message played back by the voice assistant device identifying a hotword associated with the second application implemented in the voice assistant; and
        cause the voice assistant to play the redirection to the second application.

2. The system of claim 1, wherein the at least one application generates the redirection to the second application by launching the second application in the voice assistant on behalf of the user.

3. The system of claim 2, wherein the at least one application generates the redirection by:
    obtaining an authentication token associated with a service endpoint corresponding to the second application; and
    authenticating the voice assistant in the service endpoint on behalf of the second application using the authentication token.

4. The system of claim 3, wherein the at least one application obtains the authentication token in response to a previous authentication of a user account with an identity manager through the first application, wherein the service endpoint federates user authentication of the user account to the identity manager.

5. The system of claim 1, wherein the at least one application identifies the second application by identifying a phrase matching a portion of the speech to text representation in a lookup table.

6. The system of claim 5, wherein at least one application identifies the second application by identifying an application associated with the request to which the user account is authorized to access.

7. The system of claim 5, wherein at least one application identifies the second application by identifying an application associated with the request to which the device assistant is authorized to access.

8. A non-transitory computer-readable medium comprising machine-readable instructions, wherein the instructions, when executed by at least one processor, cause a computing device to at least:
   obtain a request for data associated with a user account on behalf of a voice assistant, the request received on behalf of a first application implemented in the voice assistant, wherein the request for data comprises a voice request obtained by a microphone associated with a voice assistant device;
   obtain a speech to text representation of the representation of the request for data;
   identify a second application implemented in the voice assistant from which the data can be obtained based upon a mapping of words and phrases to other keywords;
   generate a redirection to the second application, wherein the redirection comprises a message played back by the voice assistant device identifying a hotword associated with the second application implemented in the voice assistant; and
   cause the voice assistant to play the redirection to the second application.

9. The non-transitory computer-readable medium of claim 8, wherein the instructions generate the redirection to the second application by launching the second application in the voice assistant on behalf of the user.

10. The non-transitory computer-readable medium of claim 8, wherein the instructions generate the redirection by:
   obtaining an authentication token associated with a service endpoint corresponding to the second application; and
   authenticating the voice assistant in the service endpoint on behalf of the second application using the authentication token.

11. The non-transitory computer-readable medium of claim 10, wherein the instructions obtain the authentication token in response to a previous authentication of a user account with an identity manager through the first application, wherein the service endpoint federates user authentication of the user account to the identity manager.

12. The non-transitory computer-readable medium of claim 8, wherein the instructions identify the second application by identifying a phrase matching a portion of the speech to text representation in a lookup table.

13. The non-transitory computer-readable medium of claim 12, wherein the instructions identify the second application by identifying an application associated with the request to which the user account is authorized to access.

14. The non-transitory computer-readable medium of claim 12, wherein the instructions identify the second application by identifying an application associated with the request to which the device assistant is authorized to access.

15. A method comprising:
   obtaining a request for data associated with a user account on behalf of a voice assistant, the request received on behalf of a first application implemented in the voice assistant, wherein the request for data comprises a voice request obtained by a microphone associated with a voice assistant device;
   obtaining a speech to text representation of the representation of the request for data;
   identifying a second application implemented in the voice assistant from which the data can be obtained based upon a mapping of words and phrases to other keywords;
   generating a redirection to the second application, wherein the redirection comprises a message played back by the voice assistant device identifying a hotword associated with the second application implemented in the voice assistant; and
   causing the voice assistant to play the redirection to the second application.

16. The method of claim 15, wherein generating the redirection to the second application further comprises launching the second application in the voice assistant on behalf of the user.

17. The method of claim 15, wherein generating the redirection further comprises:
   obtaining an authentication token associated with a service endpoint corresponding to the second application; and
   authenticating the voice assistant in the service endpoint on behalf of the second application using the authentication token.

18. The method of claim 17, further comprising obtaining the authentication token in response to a previous authentication of a user account with an identity manager through the first application, wherein the service endpoint federates user authentication of the user account to the identity manager.

19. The method of claim 15, further comprising identifying the second application by identifying a phrase matching a portion of the speech to text representation in a lookup table.

20. The method of claim 19, further comprising identifying the second application by identifying an application associated with the request to which the user account or the voice assistant are authorized to access.

* * * * *